United States Patent
Takamatsu et al.

(10) Patent No.: US 11,431,184 B2
(45) Date of Patent: Aug. 30, 2022

(54) POWER SUPPLY DEVICE

(71) Applicant: Toyota Jidosha Kabushiki Kaisha, Toyota (JP)

(72) Inventors: Naoyoshi Takamatsu, Shizuoka-ken (JP); Hirotsugu Ohata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 17/014,057

(22) Filed: Sep. 8, 2020

(65) Prior Publication Data

US 2021/0091573 A1 Mar. 25, 2021

(30) Foreign Application Priority Data

Sep. 20, 2019 (JP) .............................. JP2019-171810

(51) Int. Cl.
*H02J 7/00* (2006.01)
*H02J 7/34* (2006.01)
*H02M 7/5387* (2007.01)
*H02P 27/06* (2006.01)
*B60L 53/24* (2019.01)
*B60L 53/00* (2019.01)
*B60L 53/20* (2019.01)
(Continued)

(52) U.S. Cl.
CPC .............. *H02J 7/007* (2013.01); *B60L 53/24* (2019.02); *H02J 7/345* (2013.01); *H02M 7/53871* (2013.01); *H02P 27/06* (2013.01); *B60L 50/40* (2019.02); *B60L 50/60* (2019.02); *B60L 53/00* (2019.02); *B60L 53/20* (2019.02); *H02J 2207/20* (2020.01); *H02J 2207/50* (2020.01)

(58) Field of Classification Search
CPC ........ H02J 7/007; H02J 7/345; H02J 2207/20; H02J 2207/50; H02M 7/53871; H02P 27/06; B60L 53/00; B60L 53/20; B60L 53/24; B60L 50/40; B60L 50/60
USPC ................ 320/104, 109, 128, 142, 158, 163
See application file for complete search history.

(56) References Cited

U.S. PATENT DOCUMENTS 5,801,936 A * 9/1998 Mori .................... H01L 25/0655
363/132
8,599,585 B2 * 12/2013 Yasuoka ............... H02M 7/487
363/37
(Continued)

FOREIGN PATENT DOCUMENTS

DE 102016218304 B3 2/2018
EP 3065278 A1 9/2016
(Continued)

*Primary Examiner* — Edward Tso
*Assistant Examiner* — Aaron Piggush
(74) *Attorney, Agent, or Firm* — Dinsmore & Shohl LLP (57) ABSTRACT

A power supply device includes a storage battery, a capacitor unit connected to the storage battery, a power converter including three phases connected to the storage battery in parallel, a control device configured to control a switching on and off of switching elements included in the three phases respectively, a first connection terminal connected to a P terminal of a DC charger and located between first and second switching elements in any one of the three phases, and a second connection terminal connected to an N terminal of the DC charger and located between third and fourth switching elements in another one of the three phases.

5 Claims, 6 Drawing Sheets (51) Int. Cl.
*B60L 50/60* (2019.01)
*B60L 50/40* (2019.01)

(56) References Cited

U.S. PATENT DOCUMENTS

2007/0216338 A1\* 9/2007 Yoshimoto .............. B60L 53/24
  318/800
2019/0193581 A1\* 6/2019 Beulich .................... B60K 6/28
2019/0305690 A1\* 10/2019 Kusch ................... H02M 7/483

FOREIGN PATENT DOCUMENTS

| JP | 2007-252074 A | 9/2007 |
| JP | 2010-045961 A | 2/2010 |
| JP | 2016-220325 A | 12/2016 |

\* cited by examiner

POWER SUPPLY DEVICE

CROSS-REFERENCE TO RELATED APPLICATION

This application claims priority to Japanese Patent Application No. 2019-171810 filed on Sep. 20, 2019, incorporated herein by reference in its entirety.

BACKGROUND

1. Technical Field

The disclosure relates to a power supply device.

2. Description of Related Art

In a power converter for an electrically driven vehicle disclosed in Japanese Unexamined Patent Application Publication No. 2007-252074 (JP 2007-252074 A), an inverter for driving a motor generator also functions as a charger, such that it is possible to minimize vehicle parts used for charging a battery using an alternating current (AC) charger that is an external charger, thereby reducing the weight and cost of the electrically driven vehicle.

SUMMARY

However, the technology disclosed in JP 2007-252074 A is for charging AC, not for charging direct current (DC). Recently, as a DC charger used for charging a battery for driving a motor generator mounted on an electrically driven vehicle, for example, two kinds of chargers having maximum voltages of a 400V (150 kW) class and an 800V (350 kW) class, respectively, are used. Also, the DC charger is required to be able to charge the battery corresponding to a plurality of voltage standards in the electrically driven vehicle.

The present disclosure provides a power supply device that can charge a storage battery with a DC charger corresponding to a plurality of voltage standards.

A power supply device according to one aspect of the present disclosure includes: a storage battery; a capacitor unit in which a first capacitor and a second capacitor are connected in series between a positive terminal and a negative terminal of the storage battery; a power converter including a U-phase, a V-phase, and a W-phase connected to the storage battery in parallel, the U-phase, the V-phase, and the W-phase being three-level inverters respectively, and each of the three-level inverters including: a first switching element, a second switching element, a third switching element, and a fourth switching element connected in series; a first diode of which a cathode is connected to a wiring connecting the first switching element and the second switching element and of which an anode is connected to a wiring connecting the first capacitor and the second capacitor; and a second diode of which an anode connected to a wiring connecting the third switching element and the fourth switching element and of which a cathode is connected to a wiring connecting the first capacitor and the second capacitor, each of the three-level inverters being configured to selectively output, to a motor generator, a voltage of any one of three different voltage values by switching on and off each of the first switching element, the second switching element, the third switching element, and the fourth switching element; a control device configured to control a switching on and off of each of the first switching element, the second switching element, the third switching element, and the fourth switching element of the power converter; a first connection terminal electrically connected to a P terminal of a direct current charger and located between the first switching element and the second switching element in any one of the U-phase, the V-phase, and the W-phase; and a second connection terminal electrically connected to an N terminal of the direct current charger and located between the third switching element and the fourth switching element in another one of the U-phase, the V-phase, and the W-phase.

Further, in the above aspect, wherein a control mode of the control device may include a first charging mode in which the storage battery is charged without boosting power from the direct current charger and a second charging mode in which the storage battery is charged by boosting the power from the direct current charger.

As such, by including the first charging mode and the second charging mode, the storage battery can be charged in a case in which the maximum voltage of the direct current charger is equal to or higher than the voltage of the storage battery and also in a case in which the maximum voltage is lower than the voltage of the storage battery, such that it is possible to charge the storage battery with the direct current charger corresponding to a plurality of voltage standards.

Further, in the above aspect, in the second charging mode, the control device may be configured to control the switching on and off of each of the first switching element, the second switching element, the third switching element, and the fourth switching element of the power converter, such that the first capacitor and the second capacitor are alternately charged with the power from the direct current charger.

As such, it is possible to charge the storage battery by boosting the power from the direct current charger without causing current to flow through the motor generator.

Further, in the above aspect, the control device may be configured to: when the first capacitor is charged with the power from the direct current charger, switch on the first switching element in one phase having the first connection terminal from among the U-phase, the V-phase, and the W-phase, and the second switching element and the third switching element in another phase having the second connection terminal, and switch off remaining switching elements, and when the second capacitor is charged with the power from the direct current charger, switch on the second switching element and the third switching element in the one phase having the first connection terminal from among the U-phase, the V-phase, and the W-phase, and the fourth switching element in the other phase having the second connection terminal, and switch off remaining switching elements.

As such, it is possible to alternately charge the first capacitor and the second capacitor with the power from the direct current charger, and to alternately increase voltages of the first capacitor and the second capacitor.

Further, in the above aspect, the control device may be configured to, during the first charging mode, maintain on-states of the first switching element in one phase having the first connection terminal from among the U-phase, the V-phase, and the W-phase, and the fourth switching element in another phase having the second connection terminal, and maintain off-states of remaining switching elements.

As such, it is possible to secure durability of a switching element through which current flows. In addition, since an on or off state of each switching element of the power converter is fixed during charging in the first charging mode, it is possible to reduce switching loss.

In a power supply device according to the foregoing aspect of the present disclosure, a storage battery can be charged by a direct current charger corresponding to a plurality of voltage standards by electrically connecting a P terminal of a direct current charger between a first switching element and a second switching element in any one from among a U-phase, a V-phase, and a W-phase, each of which is a three-level inverter in a power converter, and by electrically connecting an N terminal of the direct current charger between a third switching element and a fourth switching element in another one.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram illustrating one example of timings of switching between the state in which the charging of the capacitor C1 is on and the state in which the charging of the capacitor C2 is on;

DETAILED DESCRIPTION OF EMBODIMENTS

Hereinafter, an embodiment of a power supply device according to the present disclosure will be described. However, the present disclosure is not limited to the embodiment.

Figure 1:
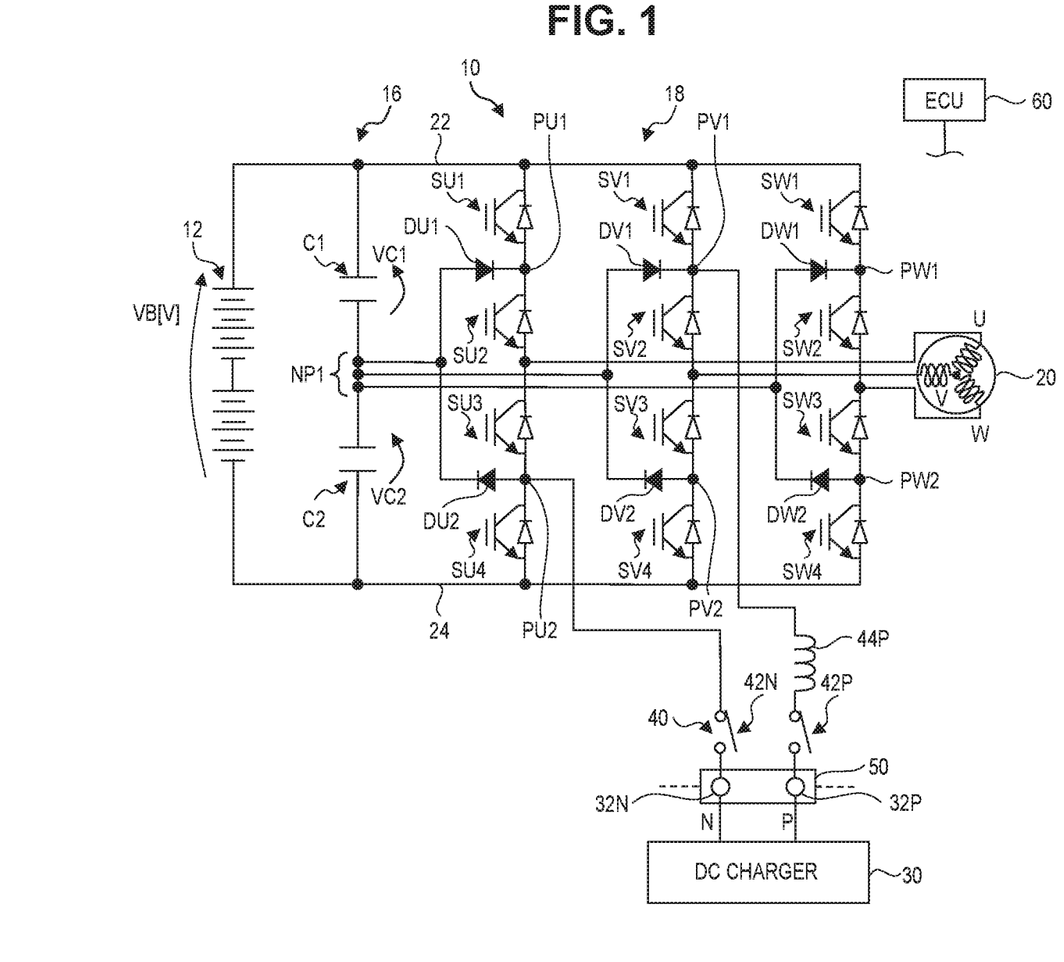
FIG. 1 is a configuration diagram of a power system according to an embodiment.

FIG. 1 is a configuration diagram of a power system according to the embodiment. The power system according to the embodiment is applied to an electrically driven vehicle that can travel using power, such as an electric vehicle, a hybrid vehicle, a plug-in hybrid vehicle (PHV) and a range extended electric vehicle (REEV).

The power system according to the embodiment includes a power supply device 10, a motor generator 20, a DC charger 30, and the like. Moreover, in the power system according to the embodiment, the power supply device 10 and the motor generator 20 are mounted on the electrically driven vehicle, and the DC charger 30 is provided in external charging equipment, and the like, provided external to the electrically driven vehicle.

The power supply device 10 includes a battery 12, a capacitor unit 16, a power converter 18, a charging relay device 40, an electronic control unit (ECU) 60, and the like. The power supply device 10 is electrically connected to the motor generator 20.

The battery 12 is a storage battery that can be charged and discharged as a high-voltage battery. As the battery 12, for example, a nickel-cadmium battery and a lead storage battery may be used in addition to a lithium-ion battery pack and a nickel-hybrid battery pack.

The capacitor unit 16 includes a first capacitor C1 and a second capacitor C2 connected to each other in series between a positive terminal (a positive bus 22) of the battery 12 and a negative terminal (a negative bus 24) of the battery 12. The capacitor C1 and the capacitor C2 are connected to each other at a neutral point NP1. In other words, one terminal of one side of the capacitor C1 is connected to the positive bus 22 and one terminal of the other side thereof is connected to the neutral point NP1. Moreover, one terminal of one side of the capacitor C2 is connected to the neutral point NP1 and one terminal of the other side thereof is connected to the negative bus 24. Therefore, assuming that the capacitors C1, C2 are charged and discharged in the same manner and always store the same amount of electric charge, a neutral point voltage, which is a voltage between the neutral point NP1 and the negative bus 24, is clamped to half of a voltage of the battery 12. The neutral point voltage corresponds to a voltage VC2 between terminals of the capacitor C2. In addition, a voltage VC1 in FIG. 1 is a voltage between terminals of the capacitor C1.

The power converter 18 includes an upper arm to which a positive voltage that is a voltage between the positive bus 22 and the neutral point NP1 is supplied, and a lower arm to which a negative voltage that is a voltage between the neutral point NP1 and the negative bus 24 is supplied. In the power converter 18, the upper arm and the lower arm are multiplexed and arranged in series between the positive bus 22 and the negative bus 24. The power converter 18 can output a three-level three-phase AC voltage to the motor generator 20.

Further, the power converter 18 includes a U-phase arm that outputs a U-phase voltage to the motor generator 20, a V-phase arm that outputs a V-phase voltage to the motor generator 20, and a W-phase arm that outputs a W-phase voltage to the motor generator 20.

In the U-phase arm, a first switching element SU1, a second switching element SU2, a third switching element SU3, and a fourth switching element SU4 are connected in series, in this order, from the positive bus 22 toward the negative bus 24. Each of the switching elements SU1, SU2, SU3, SU4 has a configuration in which a freewheeling diode is connected to a semiconductor element in inverse-parallel. The connection in reverse-parallel means that, for example, a cathode terminal of a diode is connected to a collector terminal of the semiconductor element and an anode terminal of the diode is connected to an emitter terminal of the semiconductor element. An intermediate point PU1 (a first intermediate point) as a connection portion on a wiring connecting the first switching element SU1 and the second switching element SU2, and an intermediate point PU2 (a second intermediate point) as a connection portion on a wiring connecting the third switching element SU3 and the fourth switching element SU4 are connected by diodes DU1, DU2 in such a manner that the anode side of the two diodes DU1, DU2 connected to each other in series is connected to the intermediate point PU2, and the cathode side thereof is connected to the intermediate point PU1. A connection point on a wiring connecting the two diodes DU1, DU2 is connected to the neutral point NP1 of the capacitor unit 16. In other words, the cathode side of the diode DU1 is connected to the intermediate point PU1 and the anode side thereof is connected to the neutral point NP1. In addition, the anode side of the diode DU2 is connected to the intermediate point PU2 and the cathode side thereof is connected to the neutral point NP1. In such a configuration, the U-phase voltage is output to the motor generator 20 from the connection point between the second switching element SU2 and the third switching element SU3.

In the V-phase arm, a first switching element SV1, a second switching element SV2, a third switching element SV3, and a fourth switching element SV4 are connected in series, in this order, from the positive bus 22 toward the negative bus 24. Each of the switching elements SV1, SV2, SV3, SV4 has a configuration in which a freewheeling diode is connected to a semiconductor element in inverse-parallel. An intermediate point PV1 (a first intermediate point) as a connection portion on a wiring connecting the first switching element SV1 and the second switching element SV2, and an intermediate point PV2 (a second intermediate point) as a connection portion on a wiring connecting the third switching element SV3 and the fourth switching element SV4 are connected by the diodes DV1, DV2 in such a manner that the anode side of the two diodes DV1, DV2 connected to each other in series is connected to the intermediate point PV2, and the cathode side thereof is connected to the intermediate point PV1. A connection point on a wiring connecting the two diodes DV1, DV2 is connected to the neutral point NP1 of the capacitor unit 16. In other words, the cathode side of the diode DV1 is connected to the intermediate point PV1 and the anode side thereof is connected to the neutral point NP1. In addition, the anode side of the diode DV2 is connected to the intermediate point PV2 and the cathode side thereof is connected to the neutral point NP1. In such a configuration, the V-phase voltage is output to the motor generator 20 from the connection point between the second switching element SV2 and the third switching element SV3.

In the W-phase arm, a first switching element SW1, a second switching element SW2, a third switching element SW3, and a fourth switching element SW4 are connected in series, in this order, from the positive bus 22 toward the negative bus 24. Each of the switching elements SW1, SW2, SW3, SW4 has a configuration in which a freewheeling diode is connected to a semiconductor element in inverse-parallel. An intermediate point PW1 (a first intermediate point) as a connection portion on a wiring connecting the first switching element SW1 and the second switching element SW2, and an intermediate point PW2 (a second intermediate point) as a connection portion on a wiring connecting the third switching element SW3 and the fourth switching element SW4 are connected by diodes DW1, DW2 in such a manner that the anode side of the two diodes DW1, DW2 connected to each other in series is connected to the intermediate point PW2, and the cathode side thereof is connected to the intermediate point PW1. A connection point on a wiring connecting the two diodes DW1, DW2 is connected to the neutral point NP1 of the capacitor unit 16. In other words, the cathode side of the diode DW1 is connected to the intermediate point PW1 and the anode side thereof is connected to the neutral point NP1. In addition, the anode side of the diode DW2 is connected to the intermediate point PW2 and the cathode side thereof is connected to the neutral point NP1. In such a configuration, the W-phase voltage is output to the motor generator 20 from the connection point between the second switching element SW2 and the third switching element SW3.

In the present embodiment, as each switching element of the power converter 18, an insulated gate bipolar transistor (IGBT), or the like, can be used.

The motor generator 20 is a rotating electric machine mounted on the electric vehicle. The motor generator 20 functions as a motor when the DC voltage output from the battery 12 is converted into a three-phase AC voltage by the power converter 18 and supplied, and generates driving force for traveling of the vehicle. On the other hand, the motor generator 20 functions as a generator when the vehicle is braked, recovers braking energy, and outputs the braking energy as the three-phase AC voltage. Then, the three-phase AC voltage is converted into the DC voltage by the power converter 18 and supplied to the battery 12, such that the battery 12 is charged.

The DC charger 30 is an external charger, provided external to the vehicle, which charges the battery 12. The DC charger 30 includes a P terminal (positive terminal) 32P and an N terminal (negative terminal) 32N that are two terminals electrically connected to the power supply device 10 side at a charger connection unit 50 that connects a plug (not shown) of the DC charger 30 and a connector (not shown) on the vehicle side. The charging relay device 40 having charging relays 42P, 42N and a reactor 44P are provided between the charger connection unit 50 and the power converter 18.

As illustrated in FIG. 1, the P terminal 32P of the DC charger 30 is electrically connected to the intermediate point PV1 between the first switching element SV1 and the second switching element SV2 in the V-phase arm via the charging relay 42P and the reactor 44P. Further, the N terminal 32N of the DC charger 30 is electrically connected to the intermediate point PU2 between the third switching element SU3 and the fourth switching element SU4 in the U-phase arm via the charging relay 42N.

In addition, in the power supply device 10 according to the embodiment, the intermediate points PU1, PV1, PW1, each of which is the first intermediate point in one-phase three-level inverter from among the U-phase arm, the V-phase arm, and the W-phase arm, are connected to the P terminal 32P of the DC charger 30, and the intermediate points PU2, PV2, PW2, each of which is the second intermediate point in another phase three-level inverter, are connected to the N terminal 32N of the DC charger 30.

As described above, in the power supply device 10 according to the embodiment, the first intermediate point in one-phase three-level inverter from among the U-phase arm, the V-phase arm, and the W-phase arm is used as the first connection terminal electrically connected to the P terminal 32P of the DC charger 30. Moreover, the second intermediate point in another phase three-level inverter from among the U-phase arm, the V-phase arm, and the W-phase arm is used as the second connection terminal electrically connected to the N terminal 32N of the DC charger 30.

The power supply device 10 according to the embodiment has a configuration of charging the battery 12 with the DC charger 30 corresponding to a plurality of voltage standards by electrically connecting the P terminal 32P of the DC charger 30 to the point (the first intermediate point) between the first switching element and the second switching element in any one from among the U-phase, the V-phase, and the W-phase, each of which is the three-level inverter in a power converter 18, and electrically connecting the N terminal 32N of the DC charger 30 to the point (the second intermediate point) between the third switching element and the fourth switching element in another one.

Figure 2:
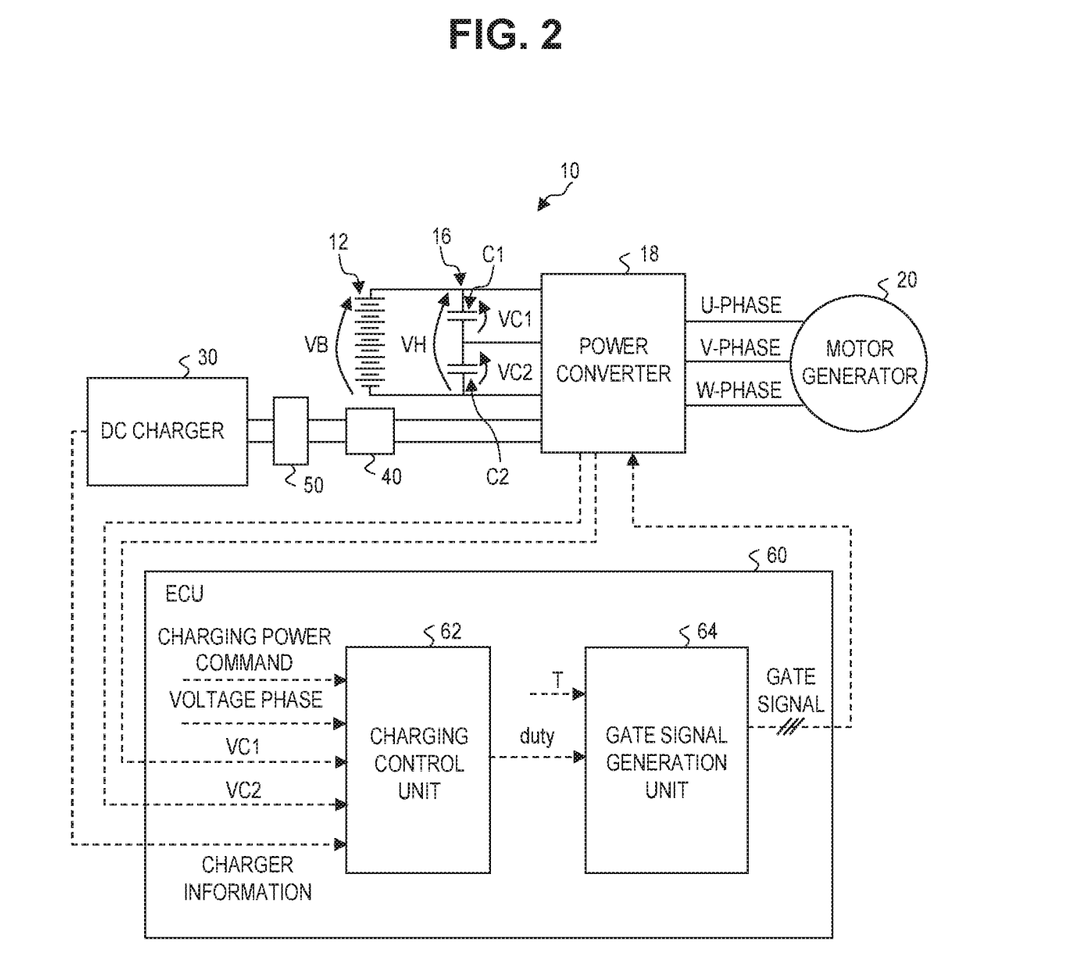
FIG. 2 is a block diagram illustrating a configuration of the power system according to the embodiment.

FIG. 2 is a block diagram illustrating a configuration of a power system according to the embodiment. The ECU 60 is an electronic control device that controls an operation of the power supply device 10, and the like. The ECU 60 includes a charging control unit 62, a gate signal generation unit 64, and the like. In FIG. 2, "VB" refers to a battery voltage, and "VH" refers to a charging voltage.

Various signals are input to the charging control unit 62. Examples of the signals include a charging power command signal output from a system control unit (not shown), a voltage phase signal output from a voltmeter (not shown) provided in the power converter 18, signals of the voltages VC1, VC2 of the capacitors C1, C2 output from a voltmeter (not shown) provided in the capacitor unit 16, and a charger information signal output from the DC charger 30. Further, the charging control unit 62 outputs, to the gate signal generation unit 64, for example, a duty obtained from the charging power command signal, the voltage phase signal, the signals of the voltages VC1, VC2, and the like. The gate signal generation unit 64 generates a gate signal for switching on and off each switching element of the power converter 18, and outputs the generated gate signal to each switching element.

In the power supply device 10 according to the embodiment, when the battery 12 is charged by the DC charger 30, a control mode of the ECU 60 includes a direct connection mode, which is a first charging mode applied when the maximum voltage of the DC charger 30 is equal to or higher than the battery voltage VB, and a boost mode, which is a second charging mode applied when the maximum voltage of the DC charger 30 is lower than the battery voltage VB. In the direct connection mode, the battery 12 is charged without boosting the power from the DC charger 30. In the boost mode, the battery 12 is charged by boosting the power from the DC charger 30. In addition, in the power supply device 10 according to the embodiment, in both the direct connection mode and the boost mode, the battery 12 is charged without causing current to flow from the DC charger 30 to the motor generator 20.

The charging control unit 62 compares the maximum voltage of the DC charger 30 with the battery voltage VB based on the charger information signal from the DC charger 30. Then, when the maximum voltage of the DC charger 30 is equal to or higher than the battery voltage VB, the battery 12 is charged by the DC charger 30 in the direct connection mode. On the other hand, when the maximum voltage of the DC charger 30 is lower than the battery voltage VB, the battery 12 is charged by the DC charger 30 in the boost mode.

Further, for example, an operator, such as a driver, may operate a switch, or the like, provided in the electrically driven vehicle on which the power supply device 10 is mounted, based on a specification (the maximum voltage) of the DC charger 30 to select between the direct connection mode and the boost mode.

Figure 3:
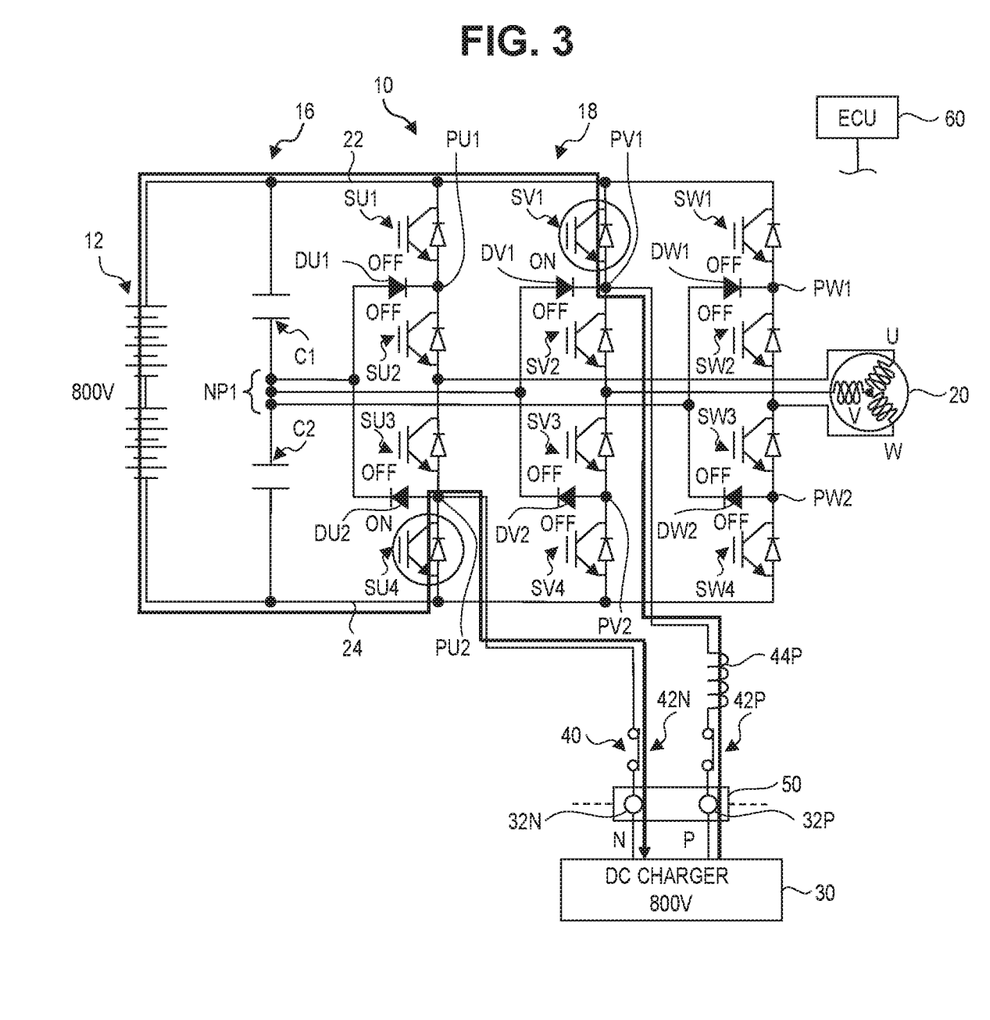
FIG. 3 is a diagram illustrating a circuit state when a battery is charged by a DC charger in a direct connection mode.

FIG. 3 is a diagram illustrating a circuit state when the battery 12 is charged by the DC charger 30 in the direct connection mode. In FIG. 3, the maximum voltage of the DC charger 30 is 800V and the battery voltage VB is 800V. In addition, in FIG. 3, switching elements that are switched on are circled.

As illustrated in FIG. 3, when the battery 12 is charged by the DC charger 30 in the direct connection mode, first, the ECU 60 switches on the fourth switching element SU4 of the U-phase arm and the first switching element SV1 of the V-phase arm, and switches off the remaining switching elements. Then, the ECU 60 switches on the charging relays 42P, 42N of the charging relay device 40 and supplies the DC voltage from the DC charger 30 to the battery 12 via the power converter 18 to charge the battery 12.

The ECU 60 may switch off the fourth switching element SU4 and the first switching element SV1 since current flows through the respective freewheeling diodes thereof. As such, since all the switching elements of the power converter 18 are switched off, it is not necessary to execute an operation for switching on and off each switching element of the power converter 18, the charging efficiency can be increased, and an inverter element and a cooling mechanism for charging do not have to be added. On the other hand, by switching on the fourth switching element SU4 and the first switching element SV1, it is possible to secure durability of the fourth switching element SU4 and the first switching element SV1 when current flows therethrough.

In addition, in the direct connection mode, since an on or off state of each switching element of the power converter 18 is fixed during charging, switching loss can be reduced.

Figure 4:
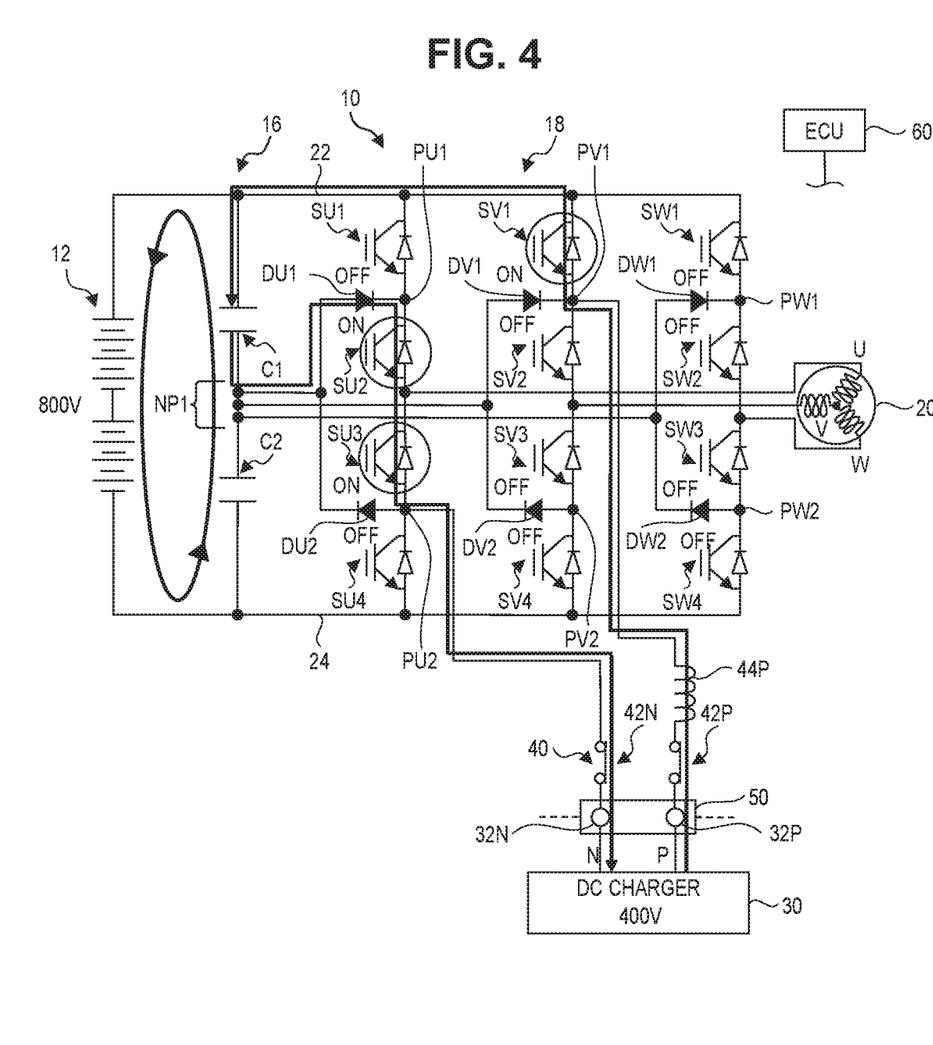
FIG. 4 is a diagram illustrating a circuit state in which charging of a capacitor C1 is in an on state when the battery is charged by the DC charger in a boost mode.
Figure 5:
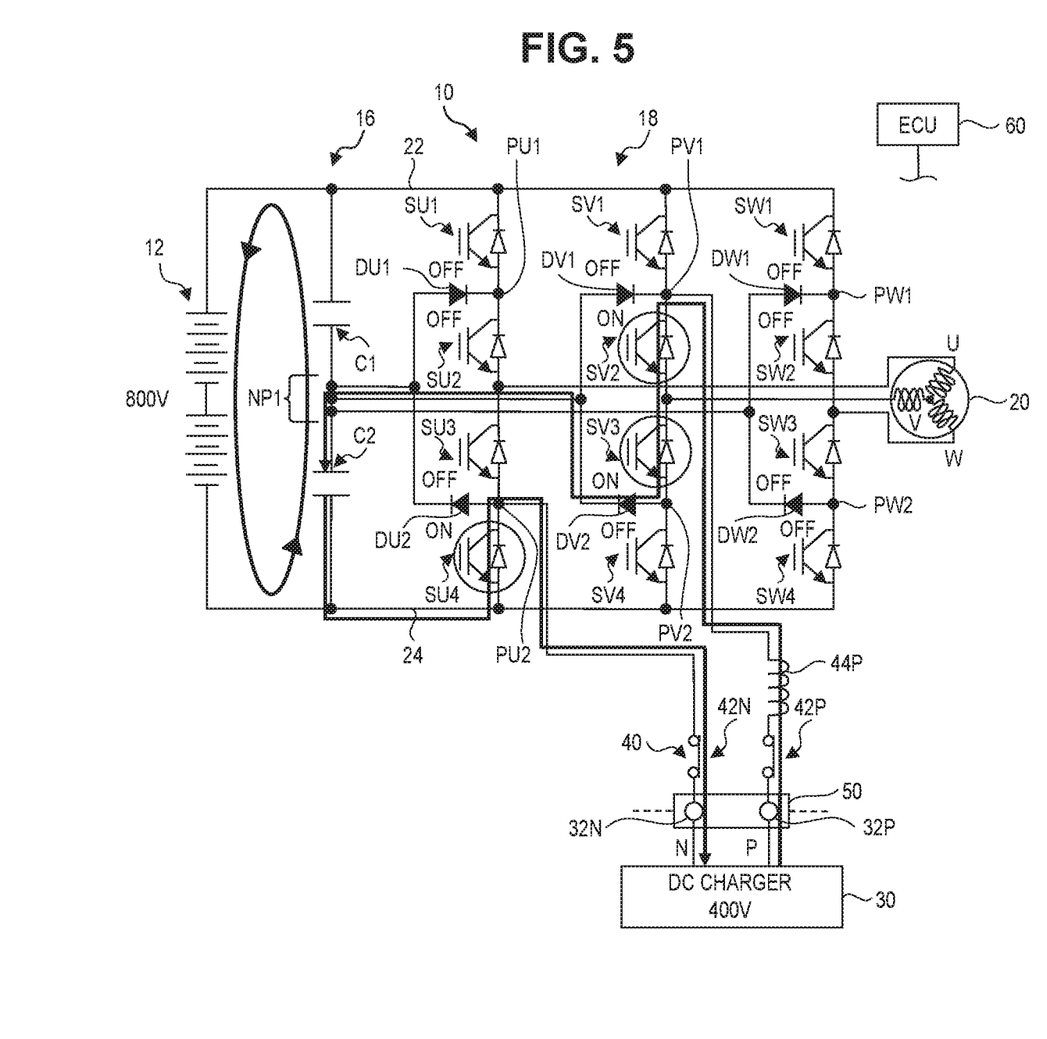
FIG. 5 is a diagram illustrating a circuit state in which charging of a capacitor C2 is in the on state when the battery is charged by the DC charger in the boost mode.
Figure 6:
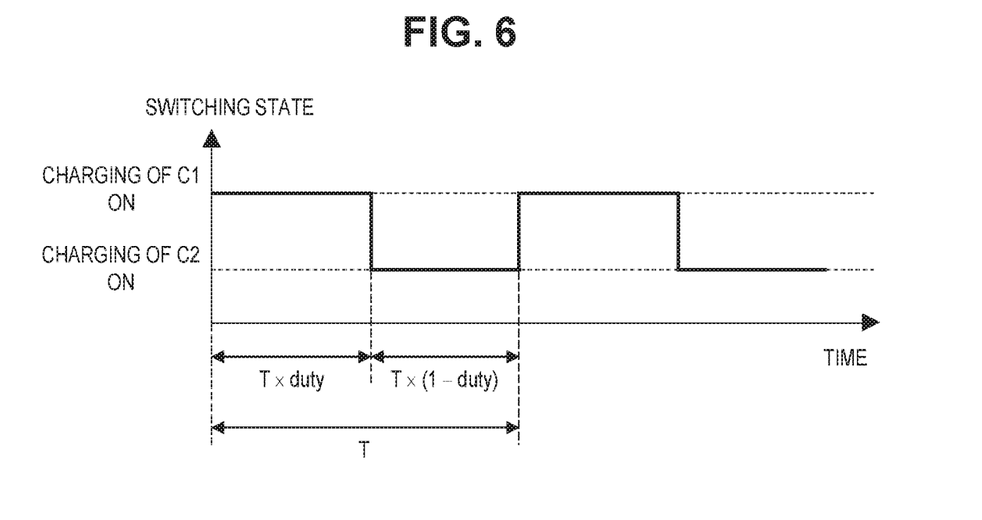

FIG. 4 is a diagram illustrating a circuit state in which charging of the capacitor C1 is in the on state when the battery 12 is charged by the DC charger 30 in the boost mode. FIG. 5 is a diagram illustrating a circuit state in which charging of the capacitor C2 is in the on state when the battery 12 is charged by the DC charger 30 in the boost mode. Further, in FIGS. 4 and 5, switching elements that are switched on are circled. FIG. 6 is a diagram illustrating one example of timings of switching between the state in which the charging of the capacitor C1 is on and the state in which the charging of the capacitor C2 is on.

In the present embodiment, as illustrated in FIG. 4, a state, in which current flows from the DC charger 30 to the capacitor C1 such that the capacitor C1 is charged in the boost mode, is referred to as "the charging of the capacitor C1 is in the on state". Further, in the present embodiment, as illustrated in FIG. 5, a state, in which current flows from the DC charger 30 to the capacitor C2 such that the capacitor C2 is charged in the boost mode, is referred to as "the charging of the capacitor C2 is in the on state".

Moreover, in the boost mode, the charging control unit 62 executes feedback control (PI control), such that the respective voltages VC1, VC2 of the capacitors C1, C2 are equalized. In this feedback control (the PI control), the duty when the charging of the capacitor C1 is in the on state and the duty when the charging of the capacitor C2 is in the on state, as represented by a rectangular pulse in FIG. 6, are calculated using the following equation (1). In FIG. 6, "T" refers to a carrier cycle. Further, in FIG. 6, a high level of the rectangular pulse means that the charging of the capacitor C1 is in the on state, and a low level of the rectangular pulse means that the charging of the capacitor C2 is in the on state.

$$\text{duty} = K_p(VC2 - VC1) + K_i \int (VC2 - VC1) dt \qquad (1)$$

In the above equation (1), "$K_p$" represents a proportional gain, and "$K_i$" represents an integral gain.

The information on the duty calculated as above is output from the charging control unit 62 to the gate signal generation unit 64.

In the boost mode, the gate signal generation unit 64 generates a gate signal for switching on and off each switching element of the power converters 18 based on the duty, a carrier cycle duty T, and the like, and outputs the generated gate signal to each switching element, such that the charging of the capacitor C1 or the charging of the capacitor C2 is in the on state.

When the battery 12 is charged by the DC charger 30 in the boost mode, first, the voltages VC1, VC2 of the capacitors C1, C2 are charged with the power from the battery 12 respectively, to be 400V, which is ½ of the battery voltage VB (800V). The voltage of the DC charger 30 is also set to 400V, which is ½ of the battery voltage VB (800V). The voltage of the DC charger 30 may be slightly higher than ½ of the battery voltage VB.

Then, for example, as illustrated in FIG. 4, the ECU 60 switches the charging of the capacitor C1 to the on state. In other words, the ECU 60 switches on the second switching element SU2 and the third switching element SU3 in the U-phase arm, and the first switching element SV1 in the V-phase arm, and switches off the remaining switching elements. As such, the current output from the P terminal 32P of the DC charger 30 to the intermediate point PV1 of the V-phase arm flows through the first switching element SV1 of the V-phase arm, the capacitor C1, and the second switching element SU2 and the third switching element SU3 of the U-phase arm, and is input from the intermediate point PU2 of the U-phase arm to the N terminal 32N of the DC charger 30. As such, when the charging of the capacitor C1 is in the on state, the capacitor C1 is charged with the power from the DC charger 30, and thus the voltage VC1 is increased. The charging of the capacitor C1 by the DC charger 30 is executed until the charging voltage VH (the voltage VC1+the voltage VC2) reaches a predetermined voltage that is higher than the battery voltage VB. The predetermined voltage may be, for example, higher than 800V. Thereafter, when determining that the sum of the voltages VC1, VC2 exceeds 800V based on the values of the voltages VC1, VC2 output from the voltmeter provided in the capacitor unit 16, the charging control unit 62 ends the charging of the capacitor C1 by the DC charger 30.

Further, the ECU 60 may switch off the first switching element SV1 since current flows through the freewheeling diode thereof. On the other hand, by switching on the first switching element SV1, it is possible to secure durability of the first switching element SV1 when current flows therethrough.

Next, as illustrated in FIG. 5, the ECU 60 switches from the state in which the charging of the capacitor C1 is on to the state in which the charging of the capacitor C2 is on. In other words, the ECU 60 switches on the fourth switching element SU4 in the U-phase arm, and the second switching element SV2 and the third switching element SV3 in the V-phase arm, and switches off the remaining switching elements. As such, in a state in which the charging voltage VH is higher than the battery voltage VB, the charging of the capacitor C1 by the DC charger 30 is stopped and the power stored in the capacitor C1 is discharged and input to the battery 12, such that the battery 12 is charged.

In addition, when the charging of the capacitor C2 is in the on state, the current output from the P terminal 32P of the DC charger 30 to the intermediate point PV1 of the V-phase arm flows the second switching element SV2 and the third switching element SV3 in the V-phase arm, the capacitor C2, the fourth switching element SU4 in the U-phase arm, and is input from the intermediate point PU2 of the U-phase arm to the N terminal 32N of the DC charger 30. As such, when the charging of the capacitor C2 is in the on state, the capacitor C2 is charged with the power from the DC charger 30, and thus the voltage VC2 is increased. The charging of the capacitor C2 by the DC charger 30 is executed until the charging voltage VH reaches a predetermined voltage that is higher than the battery voltage VB. The predetermined voltage may be, for example, higher than 800V. Thereafter, when determining that the sum of the voltages VC1, VC2 exceeds 800V based on the values of the voltages VC1, VC2 output from the voltmeter provided in the capacitor unit 16, the charging control unit 62 ends the charging of the capacitor C2 by the DC charger 30.

Moreover, the ECU 60 may switch off the fourth switching element SU4 since current flows through the freewheeling diode thereof. On the other hand, by switching on the fourth switching element SU4, it is possible to secure durability of the fourth switching element SU4 when current flows therethrough.

Next, the ECU 60 switches from the state in which the charging of the capacitor C2 is on to the state in which the charging of the capacitor C1 is on. As such, in a state in which the charging voltage VH is higher than the battery voltage VB, the charging of the capacitor C2 by the DC charger 30 is stopped, and the power stored in the capacitor C2 is discharged and input to the battery 12, such that the battery 12 is charged.

Figure 7A:
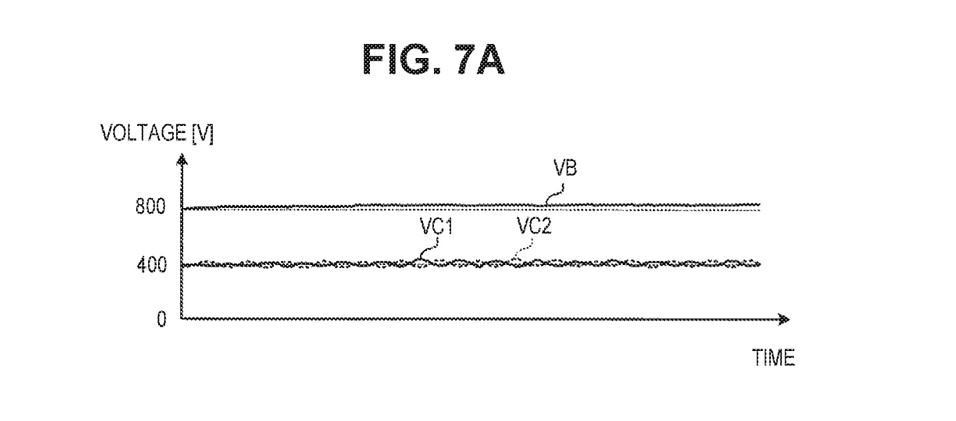
FIG. 7A is a graph illustrating changes of a battery voltage and a capacitor voltage over time during the boost mode.
Figure 7B:
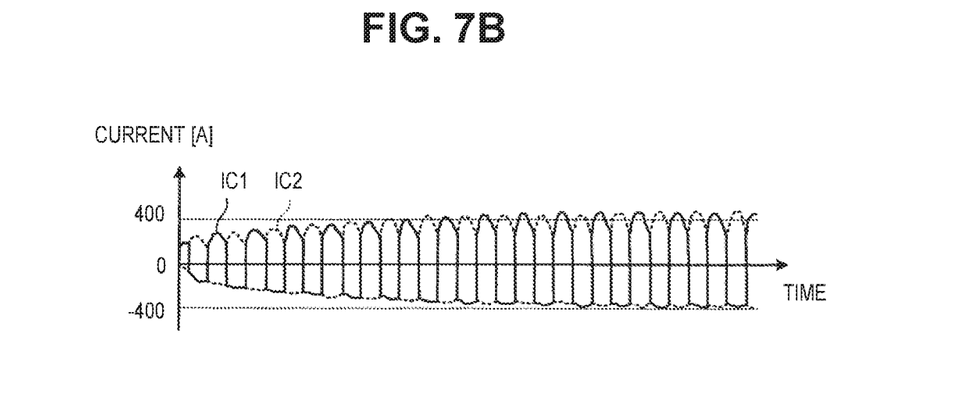
FIG. 7B is a graph illustrating a change of current flowing through the capacitors over time during the boost mode.

FIG. 7A is a graph illustrating changes of the battery voltage VB and the voltages VC1, VC2 of the capacitors C1, C2 over time during the boost mode. FIG. 7B is a graph illustrating a change of currents IC1, IC2 flowing through the capacitors C1, C2 over time during the boost mode. In addition, in FIG. 7B, the capacitors C1, C2 are charged on the positive current side with respect to OA, and the capacitors C1, C2 are discharged on the negative current side with respect to OA.

In the boost mode, by alternately switching the charging of the capacitor C1 and the charging of the capacitor C2 to the on state, as illustrated in FIGS. 7A and 7B, charging and discharging of the capacitors C1, C2 are alternately executed, and the charging voltage VH (the voltage VC1+ the voltage VC2) supplied from the DC charger 30 to the battery 12 is boosted to be higher than the battery voltage VB. For this reason, even when the maximum voltage of the DC charger 30 is lower than the battery voltage VB, the battery 12 can be charged by the DC charger 30.

Further, in the boost mode, since power is not supplied to the motor generator 20, boost is not executed using a coil of the motor generator 20 as a reactor. For this reason, since the motor generator 20 is not rotated during charging in the boost mode, it is not necessary to provide a relay that can shut off power supply between the power supply device 10 and the motor generator 20, such that it is possible to achieve reduction in cost and size.

In addition, in the boost mode, since a voltage difference between the capacitors C1, C2 and the DC charger 30 is close to 0V, current ripple due to the voltage difference can be reduced. As such, since the size of a reactor provided between the DC charger 30 and the power converter 18 can be reduced, or a reactor between the DC charger 30 and the power converter 18 can be eliminated, it is possible to achieve reduction in cost and size, and high efficiency of the power supply device 10.

As described above, in the power supply device 10 according to the embodiment, by including the direct connection mode and the boost mode in the control mode, the battery 12, which is a high-voltage battery, can be charged by both of the DC chargers 30 having, for example, a 400V class and an 800V class corresponding to a plurality of voltage standards.

Further, in the power supply device 10 according to the embodiment, the power converter 18 may be configured using an inverter having a greater number of levels than the three-level inverter. In this case, the P terminal 32P and the N terminal 32N of the DC charger 30 are electrically connected between switching elements different from the switching elements that output power from the power converter 18 to the motor generator 20.

What is claimed is:
1. A power supply device comprising:
a storage battery;

a capacitor unit in which a first capacitor and a second capacitor are connected in series between a positive terminal and a negative terminal of the storage battery;

a power converter including a U-phase, a V-phase, and a W-phase connected to the storage battery in parallel, the U-phase, the V-phase, and the W-phase being three-level inverters respectively, and each of the three-level inverters including:

a first switching element, a second switching element, a third switching element, and a fourth switching element connected in series;

a first diode of which a cathode is connected to a wiring connecting the first switching element and the second switching element and of which an anode is connected to a wiring connecting the first capacitor and the second capacitor; and a second diode of which an anode connected to a wiring connecting the third switching element and the fourth switching element and of which a cathode is connected to a wiring connecting the first capacitor and the second capacitor, each of the three-level inverters being configured to selectively output, to a motor generator, a voltage of any one of three different voltage values by switching on and off each of the first switching element, the second switching element, the third switching element, and the fourth switching element;

a control device configured to control a switching on and off of each of the first switching element, the second switching element, the third switching element, and the fourth switching element of the power converter;

a first connection terminal electrically connected to a P terminal of a direct current charger and located between the first switching element and the second switching element in any one of the U-phase, the V-phase, and the W-phase; and a second connection terminal electrically connected to an N terminal of the direct current charger and located on a wire that directly connects the third switching element and the fourth switching element in another one of the U-phase, the V-phase, and the W-phase.

2. The power supply device according to claim 1, wherein a control mode of the control device includes a first charging mode in which the storage battery is charged without boosting power from the direct current charger and a second charging mode in which the storage battery is charged by boosting the power from the direct current charger.

3. The power supply device according to claim 2, wherein, in the second charging mode, the control device is configured to control the switching on and off of each of the first switching element, the second switching element, the third switching element, and the fourth switching element of the power converter, such that the first capacitor and the second capacitor are alternately charged with the power from the direct current charger.

4. The power supply device according to claim 3, wherein the control device is configured to:

when the first capacitor is charged with the power from the direct current charger, switch on the first switching element in one phase having the first connection terminal from among the U-phase, the V-phase, and the W-phase, and the second switching element and the third switching element in another phase having the second connection terminal, and switch off remaining switching elements, and when the second capacitor is charged with the power from the direct current charger, switch on the second switching element and the third switching element in the one phase having the first connection terminal from among the U-phase, the V-phase, and the W-phase, and the fourth switching element in the other phase having the second connection terminal, and switch off remaining switching elements.

5. The power supply device according to claim 2, wherein the control device is configured to, during the first charging mode, maintain on-states of the first switching element in one phase having the first connection terminal from among the U-phase, the V-phase, and the W-phase, and the fourth switching element in another phase having the second connection terminal, and maintain off-states of remaining switching elements.

* * * * *